United States Patent [19]

Saunders

[11] 4,157,639
[45] Jun. 12, 1979

[54] GLAZING PANEL ASSEMBLY

[76] Inventor: Norman B. Saunders, 15 Ellis Rd., Weston, Mass. 02193

[21] Appl. No.: 831,898

[22] Filed: Sep. 9, 1977

[51] Int. Cl.² .................................................. F04B 1/32
[52] U.S. Cl. ........................................ 52/222; 52/781
[58] Field of Search ............... 126/270, 271; 237/1 A; 52/222, 14, 15, 478, 495, 329, 330

[56] References Cited

U.S. PATENT DOCUMENTS

| 1,870,808 | 8/1932 | Goldsmith | 52/329 |
| 2,836,859 | 6/1958 | Crissy | 52/495 |
| 3,080,022 | 3/1963 | Mote | 52/222 |
| 3,149,436 | 9/1964 | Varlonga | 52/222 |
| 3,335,530 | 8/1967 | Hurd | 52/573 |
| 3,397,500 | 8/1968 | Watson | 52/495 |
| 4,051,833 | 10/1977 | Vandament | 52/222 |

FOREIGN PATENT DOCUMENTS

| 462089 | 2/1951 | Italy | 52/222 |
| 219994 | 4/1968 | Sweden | 52/222 |
| 18287 | 8/1904 | United Kingdom | 52/478 |

Primary Examiner—John E. Murtagh
Attorney, Agent, or Firm—Schiller & Pandiscio

[57] ABSTRACT

An improved sealed glazing panel assembly includes brackets and panels secured to a suitable framing support so as to expand with temperature or moisture changes without breaking the seal of the assembly.

6 Claims, 7 Drawing Figures

GLAZING PANEL ASSEMBLY

This application relates generally to glazing and more particularly to an improved glazing panel assembly adapted for use in or with solar energy systems.

The advent of the energy crisis has created a greater interest in techniques of conserving energy as well as techniques of converting solar energy to more useful forms of energy. Along with this interest, a need for inexpensive, yet reliable glazing assemblies has been created. For example, an inexpensive technique for conserving energy in the home has been to use inexpensive sheets of plastic material secured in the window so as to function as storm windows. Although such sheets of material are relatively inexpensive, the temperature differentials and moisture changes to which the plastic sheets are exposed tends to distort the sheets, tends to drastically limit the size of the sheets that can be used, requires mounting the plastic sheets for relative movement in response to temperature which frequently results in discontinuities in the weather seal used to seal the sheets to allow such movement. Further, the sheets have a tendency to warp or tear and can be difficult to view through.

Inexpensive glazing assemblies are also desirable for providing overglazing, i.e. covering and protecting various solar energy systems such as solar energy collectors mounted in the roofs and/or walls of buildings. In this latter situation, it is desirable to provide a suitably strong, yet inexpensive glazing assembly so that the solar energy systems will be adequately protected and suitably sealed from the elements, such as rain or snow, and yet provide minimum hindrance to the operation of the particular solar energy system.

Although attempts have been made to use inexpensive materials for such glazing panel assemblies, many of the materials are dimensionally unstable because of high coefficients of thermal expansion and/or are sensitive to changes in ambient humidity resulting in undesirable warpage, leakage, breakage and other similar problems.

It is therefore a general object of the present invention to provide an improved glazing panel assembly which overcomes or substantially minimizes the aforementioned problems of the prior art and more particularly which provides a relatively strong glazing panel assembly which can be used to provide overglazing for conserving energy and for the protection of solar energy systems from adverse environmental conditions; which can be made, assembled and disassembled easily with minimum effort and damage to the assembly; which provides a substantially monolithic outer surface; and which can be made from relatively inexpensive materials.

These and other objects are achieved by an improved glazing panel assembly having a suitable framing support. The panel assembly comprises, in combination, at least two elongated brackets; means for mounting the brackets to the frame structure so that the brackets are expandable in their elongated direction, disposed parallel to one another and spaced apart by a predetermined distance; and at least one flexible, yet substantially rigid, glazing panel. The panel has a width between two oppositely disposed edges slightly larger than the predetermined direct distance between the brackets so that the panel can be secured between the brackets by bending the panel and securing the oppositely disposed edges to the brackets. The panel is made of a material having a similar or substantially the same coefficient of thermal expansion as the brackets and is sealed to the brackets and framing support in such a manner that the panel expands and contracts with the brackets while maintaining its seal with the brackets and framing support.

Other objects of the invention will in part be obvious and will in part appear hereinafter. The invention accordingly comprises the product possessing the features, properties and relation of components which are exemplified in the following detailed disclosure and the scope of the application of which will be indicated in claims.

For a fuller understanding of the nature and objects of the present invention, reference should be had to the following detailed description taken in connection with the accompanying drawing wherein.

In the drawings the same numerals are used to refer to like parts.

Referring to FIGS. 1–5 the glazing panel assembly of the present invention generally includes framing support 10, brackets 12 adapted to be attached to the support 10, and the glazing panels 14.

Figure 1:
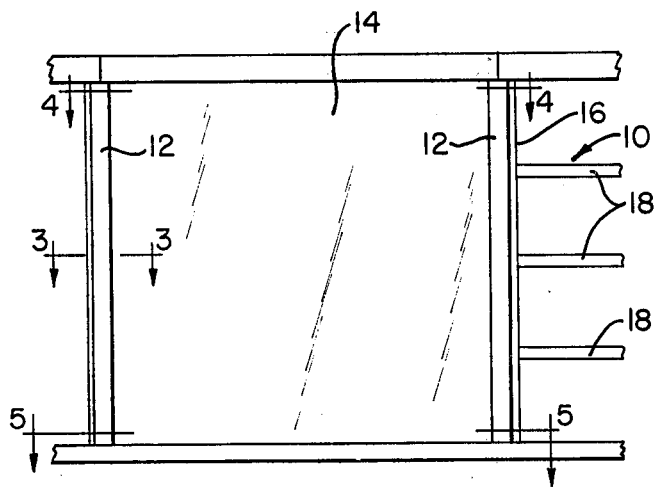
FIG. 1 is a plan view of an embodiment of the present invention.
Figure 2A:
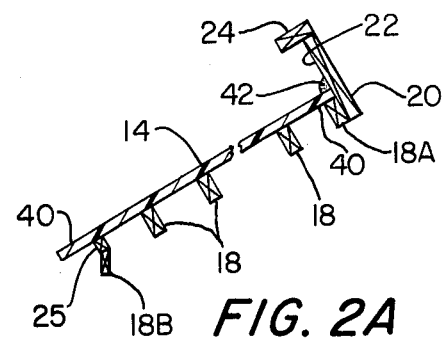
FIGS. 2A and 2B are cross-sectional views of a panel assembly used in a roofing structure and wall structure, respectively.
Figure 2B:
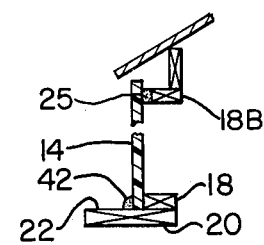

The framing support 10 may be specifically provided to support the brackets 12 and panel 14, or it may be provided at least in part by the wall posts and studs of a wall (see FIG. 2B) or the rafters and trusses of a roof (see FIG. 2A) of a building, depending upon the use to which the panel assembly is being put. Accordingly, the framing support may be made of any suitable material, with wood being preferred. The framing support generally includes the supporting beams or studs 16 which support a plurality of cross-bracing members 18, the latter being suitably spaced from one another. The cross-bracing member 18A at one edge of the framing support (typically the upper edge in roofs as shown in FIG. 2A and the lower edge in walls as shown in FIG. 2B) is attached to an end board 20. The latter has a portion extending beyond the longitudinal edge of the member 18A so as to form a lip 22. The edge of the lip may be attached to the front board 24 (as shown in FIG. 2A) as a weather protection strip. With or without the front board 24, the lip 22 is adapted to contact the edge 46 of the panel 14. The lip is substantially linear in dimension but wide enough to accommodate the curved panel. Cross-bracing member 18B at the opposite end of framing support 10 (shown at the bottom edge of the roof in FIG. 2A and the top edge of the wall shown in FIG. 2B) contacts the glazing panel 14 so that the panel extends beyond the member 18B. A resilient sealing strip 25 (see FIG. 5) is provided between the inner side of the panel 14 and is designed to maintain a seal between the panel and member 18B when the panel expands and contracts due to temperature and humidity changes.

Figure 4:
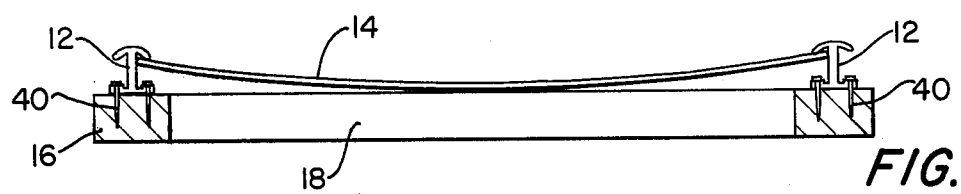
FIG. 4 is a cross-sectional view taken along line 4—4 of FIG. 1.

The brackets 12 are used to secure the side edges of the panel 14 to the framing support 10. The brackets 12 are oriented generally in a parallel, spaced-apart relationship with respect to one another and each is directly secured on the front of the framing support. Each bracket generally includes a base plate 26 and center portion 28. The base plate 26 is formed with a groove 30 on each side of the center portion which extends adjacent to and parallel with the center portion. The grooves are adapted to provide a runoff for any condensation forming on the brackets. The sides 32 of center portion 28 are preferably provided with a specularly reflective surface so as to reflect off-axis sun beams inward. The embodiment shown in FIG. 3 further includes the end section 34 so that the bracket has generally, an I-shaped cross-sectional configuration. The longitudinal edges 36 of the end section 30 are preferably dogeared so as to form with the center portion 28, retention grooves 38. Each bracket is securely attached near its end, closest to the cross-bracing member 18A with any suitable means such as nails or screws 40 as shown in FIG. 4. Additional means such as nails or screws 40A (shown in FIGS. 3 and 5) are provided at predetermined intervals along the support 10 so as to allow the bracket 12 to freely expand and contract along its longitudinal direction, while restraining movement in directions perpendicular to the longitudinal direction of the bracket 12.

Two adjacent brackets 12 are used to support a glazing panel 14. The latter is made of a sheet of material dimensioned so that its width between two opposing ends 44 is such that the panel fits between cross-bracing members 18 with one end 46 disposed against the lips 22 and the other end 48 overlapping the resilient strip 25. The width of the panel 14 between ends 44 is such that it is slightly larger than the spacing between the center portions 28 of two adjacent brackets 12 so that the panel can be bent or arched in order that the longitudinal edges of the panel can be snap-fitted in a tight fitting relationship with the brackets. A sealant 42, such as commercially available silicone, may be used to seal the edges of the panel to the brackets 12 and the lip 22 formed by the board 20.

Figure 5:
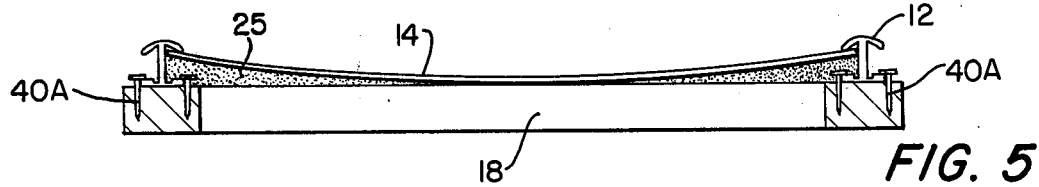
FIG. 5 is a cross-sectional view taken along line 5—5 of FIG. 1.
Figure 6:
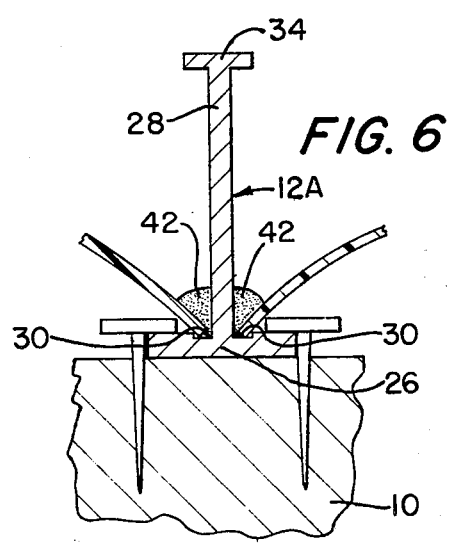
FIG. 6 is a cross-sectional view of an alternative embodiment of the bracket of the assembly of the present invention.
Figure 3:
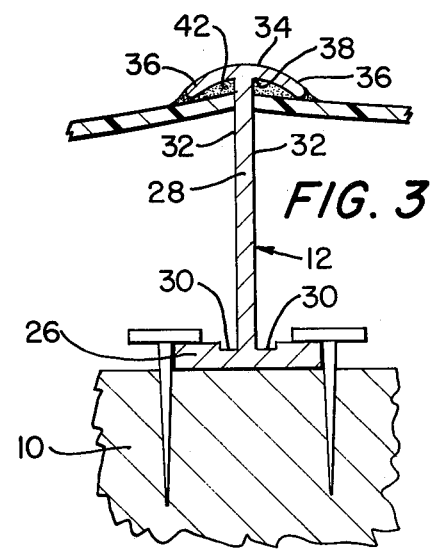
FIG. 3 is a cross-sectional view taken along line 3—3 of FIG. 1.

As shown in FIGS. 4 and 5, where the panels are relatively large, e.g. sixteen feet by four feet, or they are oriented in their plane or planes having a horizontal component, the panel preferably is bent or bowed in an inward direction, i.e. toward the framing 10 so that the center portion can contact or rest upon the cross-bracing members with a sufficient restoring force greater than imposed by ambient weather. Alternatively, however, it may be desirable to bend the panel outwardly with respect to the framing 10. In such a situation, modifications in the bracket 12 may be made and the panel mounted as shown in FIG. 6. Specifically, the grooves 30 are adapted to receive the longitudinal edges of the panel as well as sealant 42. In this embodiment, the end section 34 may or may not be modified.

Where the panels 14 are used in the roof, such as shown in FIG. 2A, and are bowed inwardly, as shown in FIGS. 1-5, the trough shape of the panels 14, helps to divert rain away from the side edges of the panels, where the panels are secured to the brackets 12. The board 24 helps to keep the sealant 42 dry, and the end 48 overhanging the member 18B provides a run off for rain water. Generally, since the panel end 46 is secured to the lip 22, any changes in the length of the panel will easily occur relative to the members 18 and 18B since the panel is free to slide relative to these members. Similarly, since the brackets are made of a material having a similar coefficient of thermal expansion, the brackets can freely expand or contact with the panels without the seal provided by the sealant 42 being broken. The end sections 34 of each of the brackets 12 serve the added function of supporting ladders, staging or the like without damage to the glazing panels 14. The grooves 30 in the base plate 26 of the brackets 12 serve to channel condensate, or any leakage occurring in the sealant 42 between a panel and bracket, particularly advantageous in the roof structure of FIG. 2A, where the condensate flows down the eaves and out.

Where the present invention is employed on a roof having a southern exposure, the curvature of the glazing panels 14 is believed to slightly enhance the transmission of early morning and late evening winter sun through the assembly.

The panel assembly as described offers several advantages. First, by making the panels 14 and brackets 12 of the same material or of materials having similar coefficients of thermal expansion, the brackets 12 which are free to expand and contract will do so with the panels 14 without substantially damaging the panels, or breaking the panel edge seals provided by the sealant 38. In this way, relatively inexpensive plastic materials can be utilized so as to provide relatively inexpensive glazing panel assemblies.

Since certain changes may be made in the above products without departing from the scope of the invention herein involved, it is intended that all matter contained in the above description or shown in the accompanying drawing shall be interpreted in an illustrative and not in a limiting sense.

What is claimed is:

1. For use with a structure having suitable exterior framing, an improved glazing panel assembly comprising, in combination:

at least two elongated brackets, each including a base plate having oppositely disposed edges and a center portion extending transversely from said base plate between said edges;

means for mounting said base plates of said brackets to said framing structure so that said brackets are in a substantially parallel relationship, spaced-apart by a predetermined distance and so that said brackets are expandable in their elongated direction;

at least one flexible, resilient, substantially rigid glazing plate having a width between two oppositely disposed edges slightly larger than said predetermined distance so that said panel plate can be compressed between and secured against said center portions of said brackets by bending said plate along its length and securing said oppositely disposed edges between said center portions; and a resilient sealing strip for insertion between one end of said panel and said framing structure;

wherein said brackets and said panel are secureable to said framing at the other end of said panel opposite said one end so that said panel and brackets expand and contract together relative to said framing and said resilient strip.

2. An assembly in accordance with claim 1, wherein the sides of said center portion of said bracket are specularly reflective.

3. An assembly in accordance with claim 1, wherein said means for mounting said base plates includes means for allowing said brackets to expand and contract in their elongated direction and preventing said brackets from moving in directions transverse to said longitudinal direction.

4. An assembly in accordance with claim 1, wherein each of said brackets further includes an end section attached to said center portion so as to form a groove for receiving an oppositely disposed edge of said panel.

5. An assembly in accordance with claim 1 wherein said panels are curved between said brackets and supported in part by said framing structure.

6. An assembly in accordance with claim 1, wherein said base plate of each of said brackets includes groove means for channeling condensate formed on each of said brackets.

* * * * *